United States Patent
Han

(10) Patent No.: US 9,756,291 B2
(45) Date of Patent: Sep. 5, 2017

(54) DISPLAY ROOM MIRROR SYSTEM

(71) Applicant: LG INNOTEK CO., LTD., Seoul (KR)

(72) Inventor: Jung Hyuck Han, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 264 days.

(21) Appl. No.: 14/036,138

(22) Filed: Sep. 25, 2013

(65) Prior Publication Data

US 2014/0085471 A1 Mar. 27, 2014

(30) Foreign Application Priority Data

Sep. 25, 2012 (KR) .................. 10-2012-0106546

(51) Int. Cl.
| | |
|---|---|
| *H04N 7/18* | (2006.01) |
| *B60R 1/00* | (2006.01) |
| *B60R 1/04* | (2006.01) |
| *B60R 1/08* | (2006.01) |
| *B60R 1/12* | (2006.01) |

(52) U.S. Cl.
CPC ............. *H04N 7/18* (2013.01); *B60R 1/00* (2013.01); *B60R 1/04* (2013.01); *B60R 1/08* (2013.01); *B60R 1/088* (2013.01); *B60R 2001/1215* (2013.01); *B60R 2300/8026* (2013.01)

(58) Field of Classification Search
CPC .... B60R 1/00; B60R 1/04; B60R 1/08; B60R 1/088; B60R 2001/1215; B60R 2300/8026; H04N 7/18
USPC ........................................................ 348/148
See application file for complete search history.

(56) References Cited

U.S. PATENT DOCUMENTS

| | | | | |
|---|---|---|---|---|
| 5,956,181 | A * | 9/1999 | Lin | B60R 1/12 359/630 |
| 6,262,831 | B1 * | 7/2001 | Bauer | B60R 1/088 359/264 |
| 6,407,468 | B1 * | 6/2002 | LeVesque | B60R 1/088 307/10.1 |
| 6,420,975 | B1 * | 7/2002 | DeLine | B60R 1/12 340/425.5 |
| 6,477,464 | B2 * | 11/2002 | McCarthy | B60R 1/12 340/461 |
| 6,498,620 | B2 * | 12/2002 | Schofield | B60N 2/002 348/118 |
| 9,264,672 | B2 * | 2/2016 | Lynam | B60R 1/00 |

(Continued)

FOREIGN PATENT DOCUMENTS

| WO | WO-01-64481 A2 | 9/2001 |
|---|---|---|
| WO | WO-2008/002989 A2 | 1/2008 |

OTHER PUBLICATIONS

European Search Report in European Application No. 13185845.8.

*Primary Examiner* — Shan Elahi
(74) *Attorney, Agent, or Firm* — Saliwanchik, Lloyd & Eisenschenk

(57) ABSTRACT

Provided is a display room mirror system, including a display module that outputs images captured by a first camera and a second camera, so that the driver can secure his or her field of vision for the side rear as well as the rear of a vehicle using only one room mirror disposed in an inner part of the vehicle without confirming the side mirror, thereby effectively reducing moving lines in the driver's field of vision.

6 Claims, 5 Drawing Sheets

(56) References Cited

U.S. PATENT DOCUMENTS

| | | | |
|---|---|---|---|
| 2002/0003571 A1* | 1/2002 | Schofield | B60C 23/00 348/148 |
| 2002/0113876 A1* | 8/2002 | Kim | B60R 25/1004 348/148 |
| 2002/0128754 A1* | 9/2002 | Sakiyama | B60Q 9/005 701/1 |
| 2003/0103142 A1* | 6/2003 | Hitomi | B60R 1/074 348/148 |
| 2004/0026947 A1* | 2/2004 | Kitano | B60R 7/04 296/24.34 |
| 2004/0036769 A1* | 2/2004 | Sadahiro | 348/148 |
| 2004/0184163 A1* | 9/2004 | Nishioka et al. | 359/726 |
| 2004/0196368 A1* | 10/2004 | Asai | B60R 1/00 348/148 |
| 2004/0196969 A1* | 10/2004 | Palett | B60R 1/12 379/454 |
| 2005/0237385 A1* | 10/2005 | Kosaka | G01B 11/00 348/42 |
| 2006/0007550 A1* | 1/2006 | Tonar | B60R 1/088 359/604 |
| 2007/0165910 A1* | 7/2007 | Nagaoka | B60W 40/04 382/104 |
| 2007/0171037 A1* | 7/2007 | Schofield | B60C 23/00 340/438 |
| 2007/0182248 A1* | 8/2007 | Blaker | B60L 1/00 307/10.1 |
| 2007/0279250 A1* | 12/2007 | Kume | G08G 1/162 340/903 |
| 2008/0055411 A1* | 3/2008 | Lee | B60R 1/00 348/148 |
| 2008/0211652 A1* | 9/2008 | Cope | B60K 35/00 340/461 |
| 2008/0231703 A1* | 9/2008 | Nagata et al. | 348/148 |
| 2008/0309852 A1* | 12/2008 | O'Donnell | 349/74 |
| 2009/0002822 A1* | 1/2009 | Tonar | B60R 1/088 359/488.01 |
| 2009/0243824 A1* | 10/2009 | Peterson et al. | 340/435 |
| 2009/0251624 A1* | 10/2009 | Ikunami | 348/837 |
| 2010/0066833 A1* | 3/2010 | Ohshima | B60R 1/00 348/148 |
| 2010/0091394 A1* | 4/2010 | DeWind | B60R 1/12 359/838 |
| 2010/0165437 A1* | 7/2010 | Tonar | B60R 1/088 359/256 |
| 2010/0201816 A1* | 8/2010 | Lee | B60R 1/12 348/148 |
| 2011/0002028 A1* | 1/2011 | Luten | B60R 1/00 359/267 |
| 2011/0279884 A1* | 11/2011 | Fujimura | G02F 1/1334 359/270 |
| 2012/0215377 A1* | 8/2012 | Takemura | B60W 30/12 701/1 |
| 2012/0236152 A1 | 9/2012 | De Wind et al. | |
| 2013/0063594 A1* | 3/2013 | Hwang | B60R 1/00 348/148 |
| 2013/0128047 A1* | 5/2013 | Lee | 348/148 |
| 2013/0222592 A1* | 8/2013 | Gieseke | G08G 1/04 348/148 |
| 2013/0250065 A1* | 9/2013 | Aoki | H04N 13/0246 348/46 |

\* cited by examiner

DISPLAY ROOM MIRROR SYSTEM

CROSS-REFERENCE TO RELATED APPLICATION

This application claims the benefit under 35 U.S.C. §119 of Korean Patent Application No. 10-2012-0106546, filed Sep. 25, 2012, which is hereby incorporated by reference in its entirety.

BACKGROUND

Field of the Invention

Embodiments of the present invention relate to a room mirror for a vehicle, which can display external images.

Description of the Related Arts

A conventional display system applied to a vehicle could ensure a driver to secure his or her field of vision for only the rear view of a vehicle. When the driver confirms the situations of left and right rear views through a conventional side mirror, there is an inconvenience that the driver should turn his or her head to left and right sides to see the side mirror. Also, since the driver cannot keep eyes forward when turning his or her head, the driver is disturbed in safe driving. In particular, it is problematic that the driver cannot rapidly respond against lane changes, unexpected situations or defensive driving during high-speed running of the vehicle.

Furthermore, in case of bad weather such as rain, the driver has difficulty in securing his or her field of vision because he or she is not able to see the side mirror due to water drops or dew condensation formed on a side window and the side mirror. It is also problematic that it is difficult for the driver to clearly recognize things through the side mirror due to side window tinting which has been recently performed.

BRIEF SUMMARY

Embodiments of the present invention have been made keeping in mind the above problems occurring in the related an. An aspect of the embodiments of the present invention provides a display room mirror system which is configured such that side rear view images of a vehicle are secured by cameras disposed at sides of the vehicle, and the secured side rear view images are displayed through a display module disposed in a room mirror so that a driver can minimize moving lines in his or her eyes during driving and can secure his or her field of vision in blind spots, thereby reducing the risk of an accident.

According to an aspect of the embodiments of the present invention, there is provided a display room mirror system including: a camera module including a first camera and a second camera configured to capture left and right rear view images of a vehicle; a room mirror mounted in an inner part of a vehicle to detect a rear situation of the vehicle; and a display module disposed in the room mirror to output the images captured by the first camera and the second camera.

An advantageous effect according to the embodiments of the present invention is that side rear images of the vehicle are obtained by the cameras disposed at the sides of the vehicle and are outputted from the display module disposed in the room mirror so that the driver can secure his or her field of vision for the side rear as well as the rear of the vehicle using only one room mirror disposed in the inner part of the vehicle without confirming the side mirror, thereby effectively reducing moving lines in the driver's field of vision.

Also, another advantageous effect according to the embodiments of the present invention is that the images outputted from the display module by the power button unit and the image conversion button can be selectively used, and reflectance of the room mirror is changed using an oxidation and reduction reaction of an electrochromic device depending on the brightness of light by applying an electrochromic mirror to the room mirror so that the driver's glariness can be controlled.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION

Exemplary embodiments according to the present invention will now be described more fully hereinafter with reference to the accompanying drawings. The exemplary embodiments of the present invention may, however, be embodied in many different forms and should not be construed as limited to the embodiments set forth herein. Rather these example embodiments are provided so that this disclosure will be thorough and complete, and will fully convey the scope of the invention to those skilled in the art. Furthermore, when it is determined that specific descriptions regarding publicly known relevant functions or configurations may unnecessarily be beside main points of the present invention, the corresponding descriptions are omitted. It will be further understood that terms used herein should be interpreted as having a meaning that is consistent with their meaning in the context of this specification. With regard to the elements which perform similar functions and operations, like numbers refer to like elements through the specification.

The gist of the embodiments of the present invention is to provide a display room mirror system which is configured such that side rear view images of a vehicle are obtained through cameras disposed at sides of a vehicle and are outputted from display modules disposed in a room mirror so that the function of a side mirror can be replaced by the room mirror, and thus the driver's field of vision for the side rear as well as the rear of the vehicle can be secured by only one room mirror disposed into the vehicle, thereby efficiently reducing moving lines in the driver's field of vision.

Figure 1:
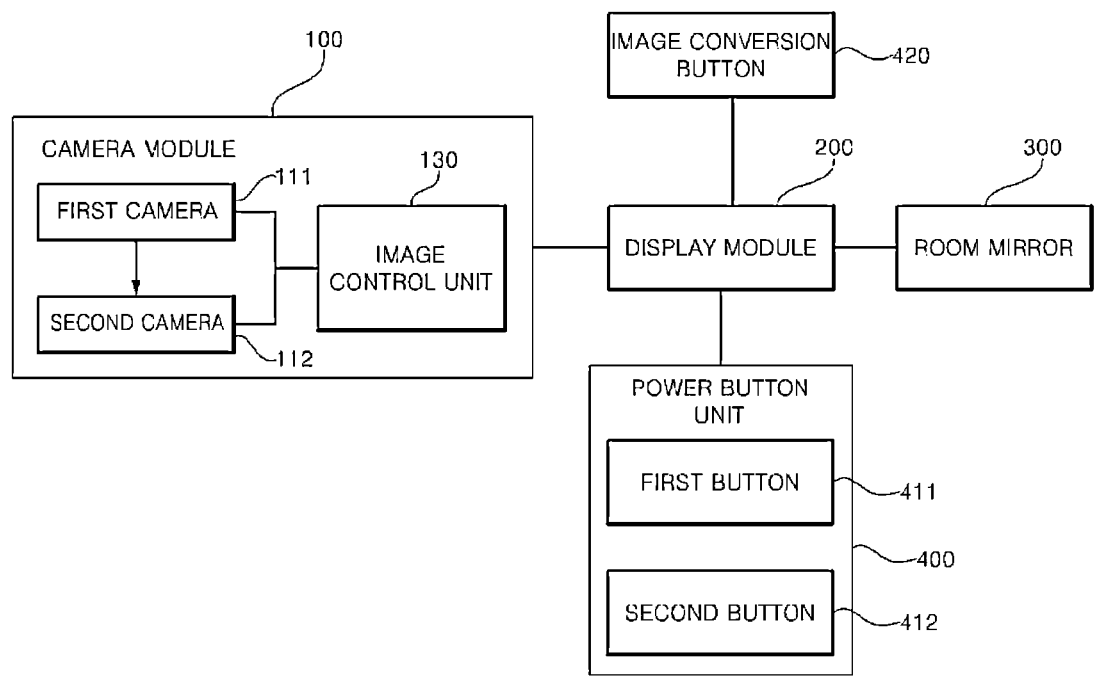
FIG. 1 is a block diagram illustrating the configuration of a display room mirror system according to an exemplary embodiment of the present invention.

FIG. 1 is a block diagram illustrating the configuration of a display room mirror system according to one exemplary embodiment of the present invention.

Referring to FIG. 1, a display room mirror system according to an exemplary embodiment of the present invention may be configured to include: a camera module 100 configured to capture side rear view images of a vehicle and adjust a capturing direction of a camera; a display module 200 configured to output the images obtained from the camera module 100; a power button unit 400 configured to turn on or off a power source of the display module 200; an image conversion button configured to selectively output the images of the display module; and a room mirror 300 detecting rear situations of the vehicle.

The camera module 100 may include: a first camera 111 and a second camera 112 mounted on both sides of the vehicle to obtain side rear view images of the vehicle; and a camera control unit 130 adjusting a capturing direction of the first camera ill and the second camera 112.

Figure 2:
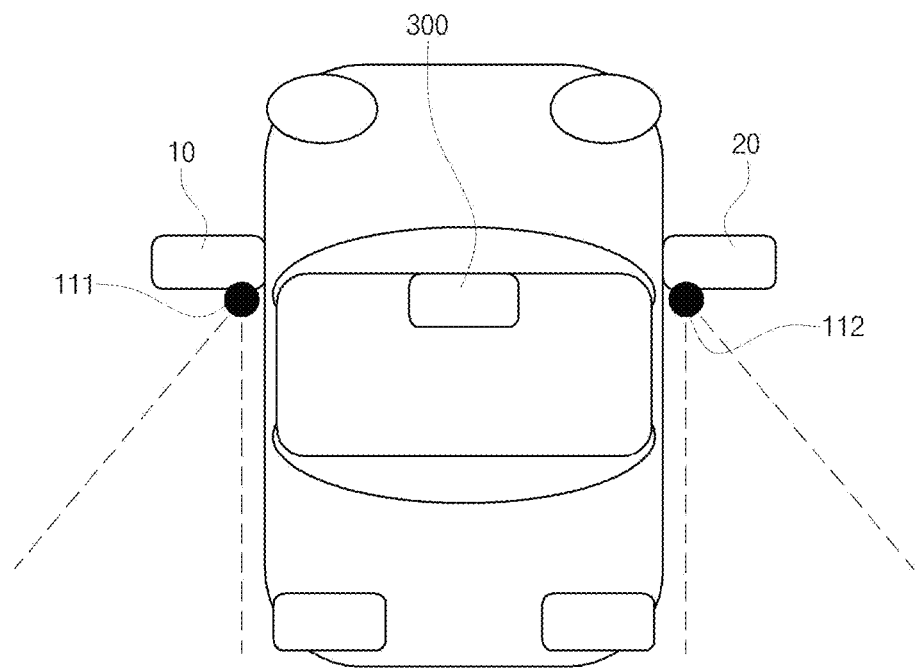
FIG. 2 schematically illustrates a structure in which a first camera and a second camera are disposed in a vehicle according to another exemplary embodiment of the present invention.

The first camera 111 and the second camera 112 are disposed on both sides of the vehicle so as to capture the side rear view images of the vehicle. Furthermore, the first camera 111 and the second camera 112 may be disposed around left and right side mirrors of the vehicle, or may be disposed at the left and right side mirrors of the vehicle as shown in FIG. 2. When the first camera 111 and the second camera 112 are disposed at the left and right side mirrors, they may be mounted to the outside of the left and right side mirrors or in the left and right side mirrors. As such, the side rear view images of the vehicle may be obtained by the first camera 111 and the second camera 112 disposed on external sides of the vehicle.

The camera control unit 130 controls a capturing direction of the first camera 111 and the second camera 112. The capturing direction may be controlled by a driver. Also, the capturing direction of the first camera 111 and the second camera 112 may be controlled depending on a steering angle of a handle. In addition, hand control by the driver and automatic control depending on a variation in the steering angle of the handle may be simultaneously performed. In the case of the hand control by the driver, the camera control unit 130 may be implemented in a button or stick form as adjusting a mirror direction of the side mirrors. If a place enables the driver to easily operate the camera control unit during driving, the camera control unit may be disposed in any place of an inner part of the vehicle without a limitation.

When the camera control unit 130 automatically controls the first and second cameras 111, 112 depending on a variation in the steering angle of the handle for the vehicle, it may be implemented so as to control each direction of the first and second cameras 111, 112 by detecting the steering angle of the handle through a sensor. That is, when the steering angle of handle is inputted to the left side, the capturing directions of the first and second cameras 111, 112 are moved to the left side depending on the steering angle so that the driving situations of a left rear view can be easily detected.

Although it is not illustrated in the drawings, the display room mirror system according to the present embodiment of the invention may further include a focusing unit performing zoom in and zoom out by changing a focusing distance of the first camera 111 and the second camera 112. The focusing unit may be implemented in a button or stick-like shape, and may change the focusing distance of a camera lens to be similar to controlling a direction of the side mirror.

Also, although it is not illustrated in the drawings, the display room mirror system according to the present embodiment of the invention may further include a separation judging unit that extracts information about a traffic lane from captured driving images and judges whether or not the vehicle gets out of the traffic lane based on the information; and a voice output unit that outputs a warning sound in order to inform the driver of lane departure.

The display module 200, which is disposed in a room mirror 300, is a means that individually or selectively displays the images captured by the first camera 111 and the second camera 112. The display module 200 may be disposed at left and right sides of the room mirror 300 with the room mirror 300 as its center, respectively, or may be disposed on rear surfaces of the left and right sides of the room mirror 300, respectively. Alternately, one display module may be disposed on a rear surface of the room mirror. The display module 200 may be composed of an LCD, an OLED or the like. As such, the left rear view images of the vehicle may be outputted through the display module located at a left side of the room mirror 300, and the right rear view images of the vehicle may be outputted through the display module located at a right side of the room mirror 300 so that the driver can detect the side rear as well as the rear of the vehicle using only the room mirror 300 without observing the side mirror, and can reduce moving lines in his or her field of vision while driving. The display module 200 will be more specifically explained in the sections regarding FIG. 3 to FIG. 8.

The power button unit 400 turns on and off a power source of the display module 200. In the case of simultaneously or individually turning on and off the display modules 200 disposed to be spaced apart from each other, the power button unit 400 may be composed of a first button 411 and a second button 412. As such, as the output of the display module 200 is controlled by the power button unit 400, the side rear view images can be selectively confirmed. That is, when the display module 200 is entirely turned off, the side rear view images are not displayed on the room mirror 300, and the room mirror 300 performs only an original function of the room mirror 300. Also, when the display module 200 is entirely turned on, the side rear view images are outputted from both sides of the room mirror 300, and the rear situations and side rear situations of the vehicle may be easily detected by only the room mirror 300. Furthermore, according to the driver's need, only one of the display modules located at the left and right sides of the room mirror 300 is turned on, thereby enabling the room mirror to be driven. A disposition structure of the power button unit 400 will be explained in more detail in the sections regarding FIG. 3 to FIG. 7.

An image conversion button 420 selectively outputs only one image among the images obtained from the first camera 111 and the second camera 112 or simultaneously dividedly outputs the images through the display module 200 disposed on the rear surface of the room mirror 300. At this time, the image conversion button 420 may be also applied to a case in which one display module 200 is disposed as well as the case in which the display modules 200 are disposed on the rear surfaces of the room mirror 300 to be spaced apart from each other. However, in the case in which the display modules 200 are spaced apart from each other, since button 411 and the second button 412 perform similar functions to each other, in the case where one display module 220 is formed on the rear surface of the room mirror 300, it would be preferable to form the image conversion button 420. The image conversion button 420 may be formed at one side of the room mirror 300.

The room mirror 300, which is a mirror mounted to enable a driver to secure his or her rear visual field in the inner part of the vehicle, may be composed of a half mirror having both properties of transmitting and reflecting light forward when the display module 200 is disposed on the rear surface of the room mirror 300. As a result, when the display module 200 operates, the driver is able to see information displayed in the display module 200 due to a transmission property of the half mirror. When the display module 200 does not operate, the half mirror is able to be used as a mirror due to a reflectance property of the half mirror. However, this is only one example. A configuration wherein the half mirror is formed in only a part corresponding to the display module 200, a configuration wherein the half mirror is mounted to the display module 200 itself, and the like could be embodied, and the configurations could be appropriately designed and changed by those having ordinary skill in the art in the relevant field.

Furthermore, the room mirror 300 may be composed of an electrochromic mirror (ECM) which changes reflectance of the room mirror 300 an as to inhibit a driver's glariness generated due to reflection of light resulting from a headlight of a rear vehicle. More specifically, the electrochromic mirror (ECM) changes the reflectance of the room mirror 300 using the redox reaction of an electro chromatic device depending on a difference in brightness of light measured by a sunlight sensor such as a photo diode measuring brightness of the front and the rear of the vehicle. Thus, the driver's glariness caused by the headlight of the rear vehicle can be controlled, thereby contributing to safe driving. A detailed structure of the electrochromic mirror will be explained in the sections below regarding FIG. 8.

FIG. 2 schematically illustrates a structure in which a first camera and a second camera are disposed in a vehicle according to another exemplary embodiment of the present invention;

Referring to FIG. 2, the first camera 111 and the second camera 112 may be mounted to a left side mirror 10 and aright side mirror 20 and may capture image for the side rear of the vehicle. As shown in the drawing, the first camera 111 and the second camera 112 may be mounted to the left and right side mirrors 10, 20, may be mounted to the outside of the left and right side mirrors 10, 20 or may be embedded in the left and right side mirrors 10, 20. Furthermore, in a case where a place allows securing the side rear images even though they are not the places where the left and right side mirrors are located, the first camera 111 and the second camera 112 may be mounted in any places of the sides of the vehicle. In the drawing, although only two cameras such as the first camera 111 and the second camera 112 are illustrated, it would be obvious that three or more cameras may be mounted.

Figure 3:
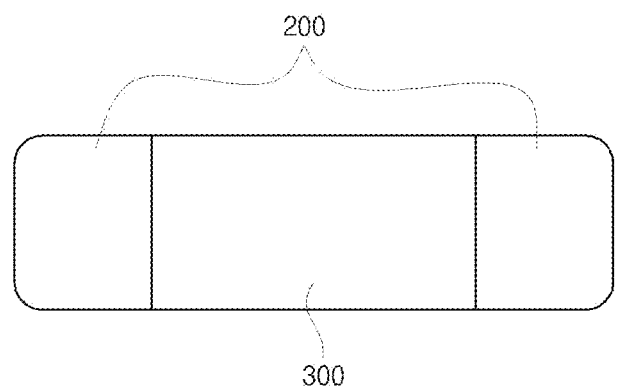
FIG. 3 through FIG. 5 schematically illustrate a structure in which a display module is disposed on both sides of a room mirror, respectively, and a structure in which a power button unit is disposed, according to still another exemplary embodiment.
Figure 4:
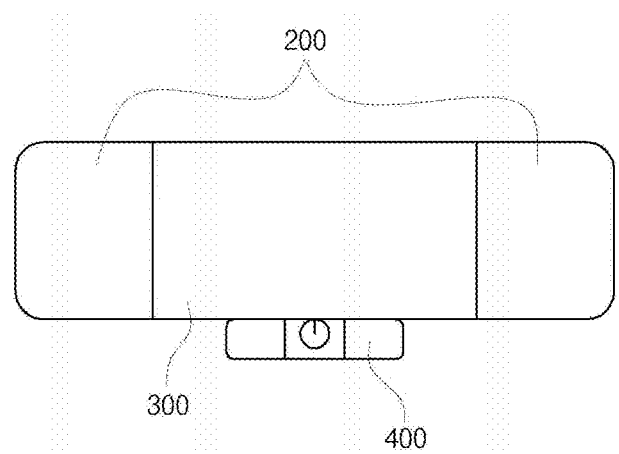
Figure 5:
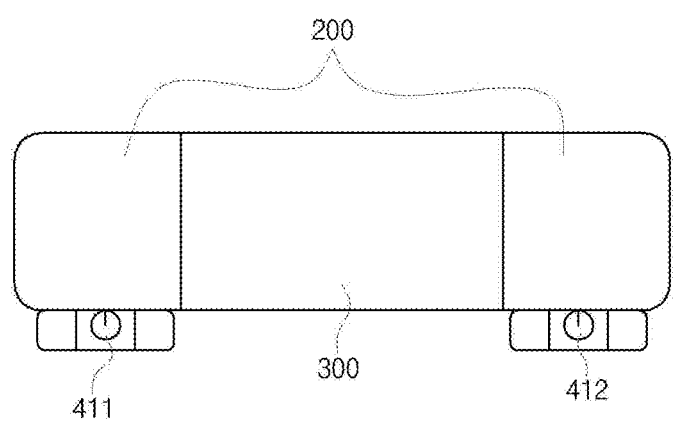

FIG. 3 through FIG. 5 schematically illustrate a structure in which a display module is disposed at both sides of a room mirror, respectively, and a structure in which a power button unit is disposed, according to still another exemplary embodiment.

Referring to FIG. 3 to FIG. 5, the room mirror 300 is disposed in the center, and the display modules are disposed on left and right sides of the room mirror 300 to be spaced apart from each other. The images captured by the first camera mounted to the side mirror on the left side of the vehicle or around the side mirror on the left side of the vehicle are displayed through the display module 200 disposed at the left side of the room mirror 300, and the images captured by the second camera mounted to the side mirror on the right side of the vehicle or around the side mirror on the right side of the vehicle are displayed through the display module 200 disposed at the right side of the room mirror 300. Furthermore, the rear situations of the vehicle may be detected through the room mirror 300 as a case of the conventional art. Thanks to this, the driver may detect the side rear situations as well as the rear situations of the vehicle using only the room mirror 300 without observing the side mirror so that the driver can rapidly and correctly respond against lane changes or unexpected situations by efficiently reducing moving lines in the driver's field of vision, thereby enabling the driver to drive safely. Furthermore, compared to the conventional side mirror, the room mirror enables blind spots to be reduced, so that the driver can secure his or her wider field of vision.

At this time, in order to selectively apply the side rear images displayed in the display module 200, the power button unit 400 may be formed as shown in FIG. 4 or 5. In FIG. 4, only one power button unit 400 which simultaneously turns on and off the power sources of the display modules disposed to be spaced apart from each other with the room mirror 300 in its center may be used. As shown in the drawings, with regard to a disposition structure thereof, the power button unit may be disposed at one end of a lower side of the room mirror 300. However, this is only one example. The power button unit may be at one side of the display module 200 as well as one end of an upper side of the room mirror 300. The disposition structure may be changed depending to the driver's convenience.

Also, as shown in FIG. 5, the power button unit 400 may be composed of a first button 411 and a second button 412 so as to individually control power sources of the display modules disposed at the left and right sides of the room mirror 300. In this case, as shown in the drawing, the first button 411 and the second button 412 may be formed at each of lower ends of the display modules 200 disposed to be spaced apart from each other. However, this is only one example. Also, the first button 411 and the second button 412 may be disposed at each of upper ends or sides of the display module 200. The disposition structure thereof may be changed depending on the driver's convenience.

Figure 6:
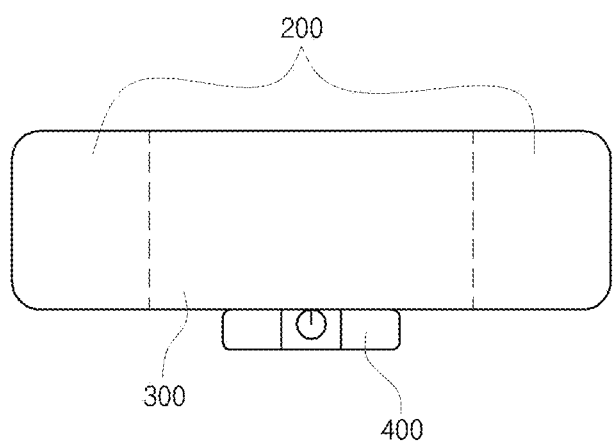
FIG. 6 and FIG. 7 schematically illustrate a structure in which a display module is disposed on a rear surface of the room mirror and a structure in which a power button unit is disposed, according to still another exemplary embodiment.
Figure 7:
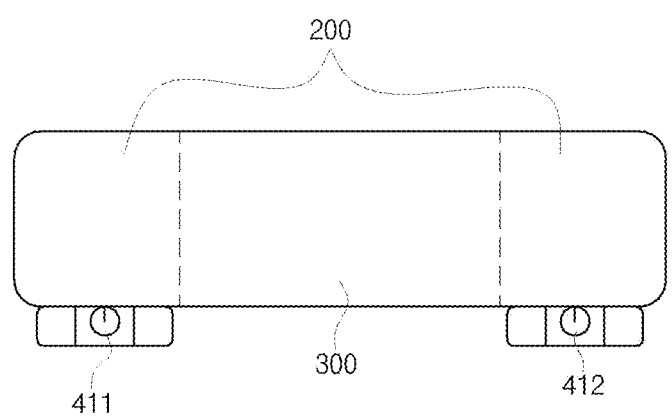

FIG. 6 and FIG. 7 schematically illustrate a structure in which the display module is disposed at the rear surface of the room mirror, and a structure in which the power button unit is disposed, according to still another exemplary embodiment.

A difference between the structures shown in FIG. 3 to FIG. 5 and the structures shown in FIG. 6 and FIG. 7 is that the display module 200 is disposed on the rear surface of the room mirror 300 rather than being directly disposed on both sides of the room mirror 300. At this time, the display module 200 may be configured such that one display module 200 is disposed on the rear surface of the room mirror, or such that two display modules 200 are disposed at the left and right of the rear surface of the room mirror 300 to be separated from each other.

As shown in FIG. 6 and FIG. 7, like the case of FIG. 3 to FIG. 5, the power button unit 400, the first button 411 and the second button 412 may be disposed in various locations such as the lower end of the room mirror, the lower end of the display module and the like depending to the driver's convenience as described above. Furthermore, although it is not illustrated, the display room mirror system may further comprise an image conversion button that selectively outputs only one image among images obtained from the first camera and the second camera or dividedly outputs the images at the same time. With regard to a disposition location thereof, the image conversion button may be disposed in various places such as a lower end of the room mirror 300 depending to the driver's convenience. Also, the image conversion button may be integrated with the power button unit 400 and thus may have power control and image conversion functions as one button.

In this case, the room mirror 300 may be composed of a half mirror having both properties of transmitting and reflecting light forward. Thus, when the display module 200 operates, the room mirror 300 enables the driver to see information displayed in the display module 200 due to the transmission property. When the display module 200 does not operate, the room mirror may be used as a mirror due to the reflectance property of the half mirror. However, this is only one example. In addition to this, a configuration in which the room mirror is formed in only a part corresponding to the display module 200 as the half mirror, a configuration in which the room mirror is mounted to the display module 200 itself as the half mirror, and the like may be embodied. The configurations may be appropriately designed and changed by those having ordinary skill in the art in the relevant field.

Also, the room mirror 300 may be composed of an electrochromic mirror (ECM) which changes reflectance of the room mirror 300 so as to inhibit a driver's glariness generated due to the reflectance of light resulting from a headlight of a rear vehicle. The electrochromic mirror may be composed of a transparent substrate and a transparent electrode and may display the images outputted from the display module 200 formed on the rear surface of the electrochromic mirror.

Figure 8:
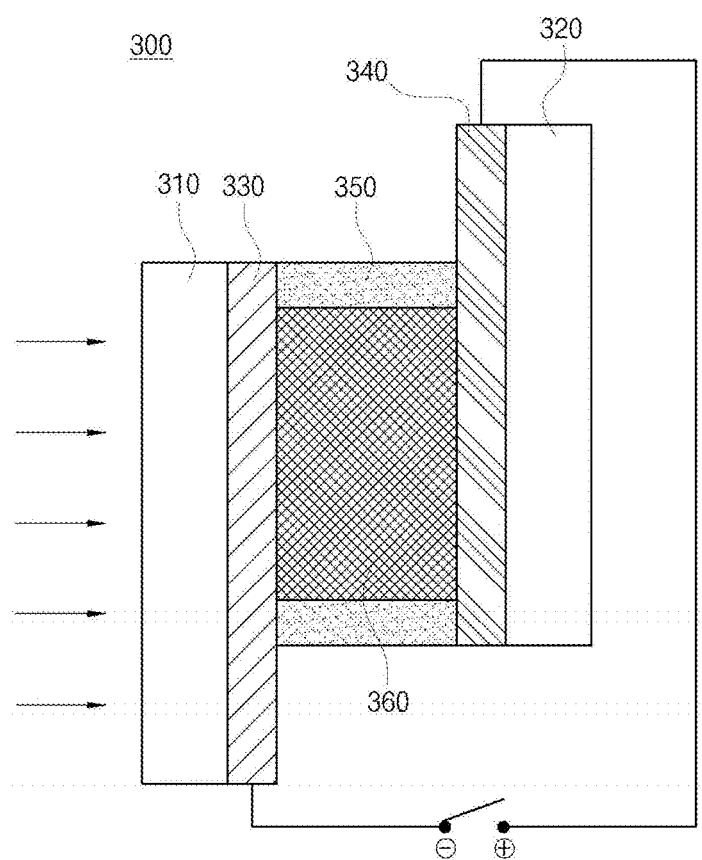
FIG. 8 illustrates the schematic structure of an electrochromic mirror according to still further another exemplary embodiment of the present invention.

FIG. 8 illustrates a schematic structure of an electrochromic mirror according to still further another exemplary embodiment.

Referring to FIG. 8, the electrochromic mirror (ECM) 300 is configured such that a first transparent substrate 310 and a second transparent substrate 320 facing each other are disposed to be spaced apart from each other, a transparent electrode 330 and a reflective layer 340 are formed on facing surfaces of the first and second transparent 310 and 320, respectively, a space is formed between the transparent electrode 330 and the reflective layer 340 using a sealant 350, and an electrochromic layer 360 is formed by injecting an electrochromic material and an electrolyte into the space formed as above.

The electrochromic material capable of undergoing the reversible changes of optical properties by an electrochemical oxidation-reduction reaction is used for the electrochromic mirror 300. The electrochromic material does not have a color when an electrical signal is not applied from an external source, and then has a certain color when the electrical signal is applied, thereby controlling reflectivity of a room mirror 300.

At this time, the transparent electrode 330 may be composed of indium doped tin oxide (ITO), antimony doped tin oxide (ATO), fluor doped tin oxide (FTO), indium doped zinc oxide (IZO), or the like. The electrochromic material may be an organic electrochromic material or an inorganic electrochromic material. The organic electrochromic material may be composed of viologen, anthraquinone, polyaniline, polypyrrole or polythiophene, and the inorganic electrochromic material may be $WO_3$, $MoO_3$, $CeO_2$, $MnO_2$ or $Nb_{2O5}$. Furthermore, the electrochromic material is a material having an electrochromic characteristic in which light absorptivity is changed by the electrochemical oxidation-reduction reaction, and the electrochemical oxidation-reduction phenomenon of the electrochromic material is reversibly generated depending on whether or not a voltage is applied, and intensity of the voltage so that transmittancy and absorbance of the electrochromic material can be reversibly changed. As the electrochromic material, a metal oxide electrochromic material containing tungsten, iridium, nickel and vanadium, an organic electrochromic material containing viologen and quinone, a conductive polymer electrochromic material containing polythiophene, polyaniline and polypyrrole, and a derivative thereof may be applied. Specifically, the electrochromic material may be any one selected from the group consisting of polythiophene, polyaniline, polypyrrole, polyanthracene, polyfluorene, polycarbazole, polyphenylenevinylene, and a derivative thereof.

Also, the first substrate 310 and the second substrate 320 may be made of a transparent substrate such as a glass substrate. Alternately, as a different example from this, any one of the first substrate and the second substrate may be formed by applying a flexible transparent substrate rather than the transparent substrate such as the conventional glass substrate thereto. Thanks to the use of the flexible transparent film, a structure of the transparent film may be formed of an electrochromic material and an electrolyte using a coating (laminating) method rather than a vacuum bonding method, so that the efficiency of processes and a reduction in production cost can be realized, and an entire thickness and weight of the electrochromic mirror can be reduced, thereby enabling a degree of freedom in design to increase. The transparent film may be composed of any one of polyethylene terephthalate (PET), polycabonate (PC), an acrylonitrile-butadiene-styrene copolymer (ABS), polymethyl methacrylate (PMMA), polyethylene naphthalate (PEN), polyether sulfone (PES), a cyclic olefin copolymer (COC), a triacetylcellulose (TAC) film, a polyvinyl alcohol (PVA) film, a polyimide (PI) film, and polystyrene (PS).

The conductive reflection layer 340 may be formed on the second substrate 320 and may serve as a reflective plate reflecting incident light by passing through the electrochromic layer 160, and a counter electrode of the transparent electrode. The conductive reflection layer 340 may be made of at least one metal selected from the group consisting of Cu, Au, Ag, Ni, Al, Cr, Ru, Re, Pb, Sn, In, and Zn, or an alloy containing these metals. However, this is only an example, but is not limited.

The electrochromic material layer of the electrochromic mirror may be in a liquid state or a solid state. When it is in a solid state, the electrochromic material layer may include an electrolyte layer and an electrochromic coating layer formed on one surface of both surfaces of the electrolyte layer. That is, the electrochromic coating layer being in the solid state may be formed at both sides of the electrolyte layer being in the liquid state, or may be formed at only one side of the electrolyte layer. When the electrochromic material layer is in the liquid state, uniform discoloration is not performed, and in order to maintain an electrochromic state, a voltage should be continuously applied, thereby causing high power consumption. However, as described above, when the electrochromatic coating layer is formed in the solid state, this enables uniform discoloration and decolorization to be realized. Also, since the electrochromic material has a memory effect, a voltage is applied only upon the discoloration and decolorization, and thus the electrochromic material consumes a small amount of power. Furthermore, since a voltage is applied upon the decolorization, the speed of a decolorization reaction is fast, and since the electrochromic material to which a coating process is applied is an inorganic or organic polymer, durability of the device can be improved.

As previously described, in the detailed description of the invention, having described the detailed exemplary embodiments of the invention, it should be apparent that modifications and variations can be made by persons skilled without deviating from the spirit or scope of the invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims and their equivalents.

What is claimed is:

1. A display room mirror system, comprising:
   a first camera mounted to a left side mirror of a vehicle and capturing a left rear view image of the vehicle;
   a second camera mounted to a right side mirror of the vehicle and capturing a right rear view image of the vehicle;
   a room mirror;
   a display module received in the room mirror, and individually displaying the left and right rear view images obtained from the first camera and the second camera;
   a sensor detecting a steering angle of a handle of the vehicle;
   a camera control unit adjusting capturing directions of the first camera and the second camera; and
   an image conversion button selecting a display mode of the display module,
   wherein the display module comprises:
   a first display module disposed at an end of a left side of the room mirror, and
   a second display module disposed at an end of a right side of the room mirror and spaced apart from the first display module,
   wherein the left rear view image is only displayed on the first display module in a first display mode,
   wherein the right rear view image is only displayed on the second display module in a second display mode, and
   wherein the first and second display modules individually display the left and right rear view images, respectively, in a third display mode,
   wherein if the steering angle of the handle is inputted to a left direction, the capturing directions of the first and the second camera are moved to the left side depending on the steering angle,
   wherein if the steering angle of the handle is inputted to a right direction, the capturing directions of the first and the second camera are moved to the right side depending on the steering angle,
   wherein the room mirror comprises:
   a first substrate and a second substrate facing each other;
   an electrode formed on a surface of the first substrate that faces the second substrate;
   a reflective layer formed a surface of the second substrate that faces the first substrate;
   a sealant formed between the electrode and the reflective layer and having a space therein; and
   an electrochromic material layer injected in the space of the sealant,
   wherein the electrochromic material layer comprises a solid electrochromic material and an electrolyte layer, and
   wherein the solid electrochromic material is formed at both sides of the electrolyte layer.

2. The display room mirror system of claim 1, further comprising: a power button unit that turns on or off a power source of the first and second display modules.

3. The display room mirror system of claim 2, wherein the power button unit is disposed at one side of the room mirror.

4. The display room mirror system of claim 1, wherein the room mirror comprises a half mirror.

5. The display room mirror system of claim 1, wherein at least one of the first substrate and the second substrate is a transparent substrate.

6. The display room mirror system of claim 5, wherein the electrode is a transparent electrode.

* * * * *